Figures 1, 2:
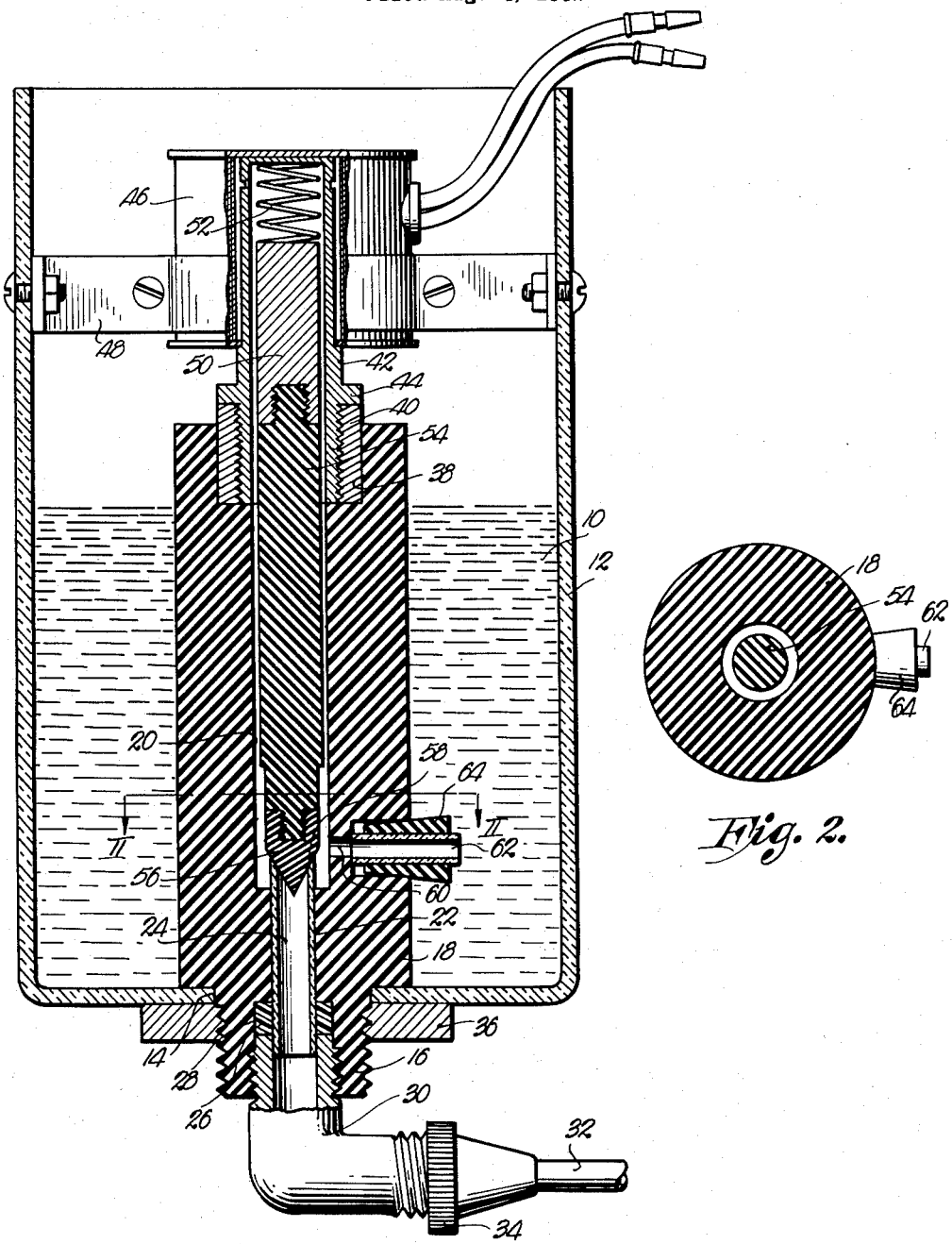

Dec. 20, 1955

J. B. TUTHILL 2,727,715

VALVE STRUCTURE

Filed Aug. 4, 1952

INVENTOR.
John B. Tuthill
BY
ATTORNEY.

though upon continued use of the valve structure and replacement of the tip 56 may be effected without tools and without removal of the body 18 from its operating position within the tank 12.

2,727,715
VALVE STRUCTURE
John B. Tuthill, Miami, Okla.

Application August 4, 1952, Serial No. 302,531

1 Claim. (Cl. 251—141)

This invention has to do with valve structure of the kind that is particularly adapted to control the flow of corrosive substances such as acids, and has therefore, for its primary object the provision of novelly arranged parts permitting the utilization of materials that are resistant to the corrosive action of such substances.

It is the most important object of this invention to provide a flow control valve for acidiferous liquids or similar corrosive substances, which valve includes parts capable of being immersed within the fluid to be controlled and including a hard rubber body, together with a reciprocable valve and valve stem of the same material, and a glass outlet tube provided with a seat cooperable with the valve in the closed position.

Another object hereof is to provide a valve having electromagnetic actuating means that is in turn provided with an iron core coupled directly with the hard rubber valve stem and disposed above the level of liquid within which the valve body is disposed.

Other objects include novel details of construction making it possible to use resistive materials in cooperation with each other while at the same time assuring that the entire assembly is leak-proof.

In the drawing:

Figure 1 is a substantially central, vertical, cross-sectional view of valve structure made pursuant to my present invention, illustrating the same operably mounted within a liquid container; and Fig. 2 is a transverse, cross-sectional view taken on line II—II of Fig. 1.

Many industries are in need of a satisfactory valve for controlling the flow of fluids which have a deleterious effect upon the valve itself, resulting in imperfect operation and frequent repair and replacement. By way of example, automatic washing machines used in laundries and even in homes, are today provided with means to measure and direct predetermined amounts of cleaning fluid to the tank of the washer. Many of the cleaning fluids are highly acidic and quickly corrode or eat away the materials forming the mechanism to control the flow thereof. Rubber, glass, and many types of synthetic plastics are resistant to such acids, and therefore, as will hereinafter be made clear, the valve structure of this invention has been adapted to make possible the use of such preferred materials.

The tank within which liquid 10 is stored, as shown in Fig. 1 of the drawing, is broadly designated by the numeral 12 and preferably made from glass or other satisfactory material capable of withstanding the corrosive action of the acidic liquid 10. Tank 12 is open at its top but may be provided with a lid if desired, and an opening 14 in the bottom wall thereof receives externally threaded end 16 of reduced diameter and forming an integral part of an elongated body 18 of relatively hard rubber that may be either natural or synthetically produced.

The body 18 has a continuous bore therethrough on its longitudinal, vertical axis that is of reduced diameter as at 22 near the lowermost end thereof for receiving a glass tube 24 by press fit. A resilient lock ring 26, preferably of plastic material surrounds the glass tube 24 and is disposed within portion 28 of bore 20 that has a larger diameter than that of bore portion 22. The bore portion 28 is internally threaded below the ring 26 for receiving an L-shaped coupling 30. Coupling 30 in turn receives a portion of the tube 24 at the lowermost end thereof and bears tightly against the resilient lock ring 26.

A conduit 32, also of plastic material is connected with the coupling 30 in any suitable manner such as by means of a connecting nut 34. Body 18 is rigidly secured to the bottom wall of the tank 12 by means of a nut 36 threaded on end 16 and bearing against the lowermost face of the tank 12.

An enlarged cavity 38 at the uppermost end of the body 18, receives a tapped bushing 40 that in turn mounts an externally threaded tube 42 having a continuous outturned flange 44 resting upon the bushing 40. The tube 42 is closed at its top and extends upwardly beyond the body 16 to receive an electromagnet 46 that may in turn be secured to the tank 12 if desired, by means of a bracket 48.

A vertically reciprocable iron core 50, within the tube 42, is held biased toward the lowermost end of its path of travel by a spring 52 overlying the same. A valve stem 54 of relatively hard rubber or the like, is releasably secured to the iron core 50 and depends therefrom within the bore 20 of body 18. A replaceable valve tip 56 is of hard rubber or plastic material and mounted on the stem 54 at the lowermost end thereof.

It is now seen that core 50, stem 54 and tip 56 reciprocate vertically as a unit toward and away from the glass tube 24 and that the tip 56 extends into the tube 24, resting on a seat 58 at the uppermost end of tube 24 when the reciprocable unit is normally held biased at the lowermost end of its path of travel. It is noteworthy that the tube 24 extends into the bore 20 above the portion 22 thereof and terminates in the seat 58 substantially in alignment with a laterally extending or radial inlet opening 60 formed in the body 18 and communicating with the bore 20. The flow of liquid 10 into the bore 20 is controlled by means of a short glass tube 62 having a hard rubber wedge member 64 surrounding the same and removably fitted within the inlet opening 60 of body 18.

It is now clear that the level of liquid 10 will rise within the bore 20 and therefore, will be always available for immediate discharge into the tube 24 upon raising of the tip 56 off of the seat 58. Thus, as long as the level of liquid 10 is above the glass tube 62, the same may be discharged into the conduit 32 merely by energizing the electromagnet 46. Such energization causes the iron core 50 to move upwardly against the action of spring 52, thereby in turn raising the stem 54 and the tip 56. Immediately upon de-energization of the electromagnet 46, the valve will close by the action of gravity as augmented by the action of spring 52.

All parts of the valve assembly that are subjected to the deleterious action of the substance 10 controlled thereby, are made from materials capable of resisting such corrosive action and by careful forming of the valve structure as shown and above described, it is possible to resort to resistant materials of this character. No leaking will occur since as is obvious, the tip 56 will always seat itself within the tube 24, and it is to be noted further that core 50, stem 54 and tip 56, as a unit, are entirely separate from all other parts of the assembly. Accordingly, as the assembly is placed in use, such unit will tend to rotate and tip 56 will not always come to rest on seat 58 in the same position. Any wear on the tip 56 will, therefore, be uniform and a tight closure presented until it becomes necessary to replace the tip 56. Such replacement is simple and inexpensive by virtue of the readily disassembled parts that have been provided herein. There will be no leakage around the tube 24 either within the bore portion 22 or within the bore portion 28. Coupling 32 receiving the lowermost end of the tube 24 and bearing tightly against the resilient lock ring 26, obviates any such possibility of leakage. Likewise, the nut 36 holds the body 18 tightly against the bottom wall of the container 12 and prevents leakage through the opening 14.

Having thus described the invention what is claimed as new and desired to be secured by Letters Patent is:

Valve structure adapted to be mounted within a tank having a bottom wall provided with an opening therein for controlling the flow of a corrosive liquid from said tank, said structure comprising an elongated, upstanding, corrosion resistant, tubular body of length adapted to extend above the level of said liquid in said tank and having a portion of reduced diameter at its lower end adapted to pass through said opening, said body having a vertical bore therethrough including an upper stretch, an internally threaded lower stretch and an intermediate stretch of reduced diameter, there being a fluid inlet in the body adjacent the lower end of said upper stretch placing the latter in communication with the exterior of the body; means adapted for releasably securing the body to the tank in tightly sealing relationship to said opening with said portion of the body extending through said opening; an elongated, corrosion resistant, wear resistant tube extending through said intermediate stretch and into the upper and lower stretches of the bore, the upper extremity of said tube presenting a valve seat; a resilient, corrosion resistant, locking ring within said lower stretch of the bore in circumscribing relationship to said tube; externally threaded, corrosion resistant means within said lower stretch disposed in compressing relationship to said ring for holding the latter within the body; an elongated, sectioned valve slidably mounted for vertical reciprocation in said bore, said valve including an uppermost, magnetically sensitive section, an intermediate, corrosion resistant section and a lowermost, removable, corrosion resistant, wear resistant, tapered section adapted to close said seat when the valve is at its lowermost reciprocated position, said intermediate section being of reduced diameter to permit accumulation of a quantity of said liquid in the lower part of said upper stretch even when the valve is in said seat closing position; means yieldably biasing said valve downwardly; and an electromagnet mounted adjacent the upper extremity of said body and adapted for electrical energization to magnetically attract said uppermost section and thereby reciprocate the valve upwardly away from said seat closing position.

References Cited in the file of this patent

UNITED STATES PATENTS

| | | |
|---|---|---|
| 283,544 | Weston | Aug. 21, 1883 |
| 1,398,025 | James | Nov. 22, 1921 |
| 1,523,035 | Murphy | Jan. 13, 1925 |
| 1,698,826 | Shaffer | Jan. 15, 1929 |
| 2,321,176 | Bloch | June 8, 1943 |
| 2,376,402 | Svirsky | May 22, 1945 |
| 2,442,599 | Herrick | June 1, 1948 |
| 2,449,438 | Wisegarver | Sept. 14, 1948 |
| 2,535,226 | Oliver | Dec. 26, 1950 |

FOREIGN PATENTS

| | | |
|---|---|---|
| 806,223 | France | Dec. 10, 1936 |
| 346,548 | Italy | Feb. 20, 1937 |
| 555,716 | Great Britain | Sept. 3, 1943 |
| 666,773 | Great Britain | Feb. 20, 1952 |
| 688,521 | Germany | Feb. 23, 1940 |
| 711,576 | Germany | Oct. 3, 1941 |